(12) United States Patent
Ji

(10) Patent No.: US 9,530,233 B2
(45) Date of Patent: Dec. 27, 2016

(54) ACTION RECORDS ASSOCIATED WITH EDITABLE CONTENT OBJECTS

(71) Applicant: Adobe Systems Incorporated, San Jose, CA (US)

(72) Inventor: Junchao Ji, Beijing (CN)

(73) Assignee: Adobe Systems Incorporated, San Jose, CA (US)

( * ) Notice: Subject to any disclaimer, the term of this patent is extended or adjusted under 35 U.S.C. 154(b) by 252 days.

(21) Appl. No.: 14/051,146

(22) Filed: Oct. 10, 2013

(65) Prior Publication Data

US 2015/0106337 A1   Apr. 16, 2015

(51) Int. Cl.
*G06F 17/30* (2006.01)
*G06T 11/60* (2006.01)
*G06F 17/24* (2006.01)

(52) U.S. Cl.
CPC ............ *G06T 11/60* (2013.01); *G06F 17/24* (2013.01)

(58) Field of Classification Search
CPC ............ G06F 11/1451; G06F 11/14658; G06F 11/1464
USPC ....... 707/644, 695, 756, 500, 101, 200, 610; 715/500, 530, 770, 256, 502
See application file for complete search history.

(56) References Cited

U.S. PATENT DOCUMENTS

| | | | | |
|---|---|---|---|---|
| 5,339,423 | A * | 8/1994 | Beitel | G06F 17/30 |
| 7,567,257 | B2 * | 7/2009 | Antoch | G06F 9/4443 |
| | | | | 345/619 |
| 7,941,438 | B2 * | 5/2011 | Molina-Moreno et al. | 707/756 |
| 8,095,575 | B1 * | 1/2012 | Sharma | G06F 17/211 |
| | | | | 707/811 |
| 8,832,047 | B2 * | 9/2014 | Herbach et al. | 707/694 |
| 9,053,484 | B1 * | 6/2015 | Tulek et al. | |
| 2001/0049704 | A1 * | 12/2001 | Hamburg | G06F 17/24 |
| | | | | 715/234 |
| 2003/0023622 | A1 * | 1/2003 | Obermeyer et al. | 707/500 |
| 2003/0149941 | A1 * | 8/2003 | Tsao | 715/530 |
| 2004/0199867 | A1 * | 10/2004 | Brandenborg | G06Q 10/06 |
| | | | | 715/201 |
| 2004/0267823 | A1 * | 12/2004 | Shapiro | G06F 17/30067 |
| 2005/0091576 | A1 * | 4/2005 | Relyea et al. | 715/502 |
| 2005/0154994 | A1 * | 7/2005 | Chen et al. | 715/770 |
| 2005/0223325 | A1 * | 10/2005 | Naitou | G06F 17/2247 |
| | | | | 715/255 |
| 2007/0162486 | A1 * | 7/2007 | Brueggemann | G06F 17/30908 |

(Continued)

*Primary Examiner* — Mariela Reyes
*Assistant Examiner* — Thong Vu
(74) *Attorney, Agent, or Firm* — Wolfe-SBMC

(57) ABSTRACT

A program manages various different parts of editable content, including one or more objects. Various different actions can be performed on an object to edit or change the object in some manner. A program presenting the editable content maintains one or more object action records, each object action record being a record of actions performed on a particular object of the editable content. A program can also maintain a document action record that includes indications of actions performed on parts of the editable content that are not objects having an associated object action record, as well as optionally actions performed on the objects having an associated object action record. In response to a user request to undo an action on a particular object, the actions in the object action list associated with the particular object are undone without undoing any intervening actions performed on other parts of the editable content.

20 Claims, 8 Drawing Sheets

(56) References Cited

U.S. PATENT DOCUMENTS

| | | | |
|---|---|---|---|
| 2008/0172607 A1* | 7/2008 | Baer | G06F 17/24 |
| | | | 715/255 |
| 2009/0138792 A1* | 5/2009 | Cudich | G06F 17/2288 |
| | | | 715/234 |
| 2009/0249239 A1* | 10/2009 | Eilers | G06F 17/24 |
| | | | 715/769 |
| 2010/0036860 A1* | 2/2010 | Hiura | G06F 17/2247 |
| | | | 707/634 |
| 2010/0083136 A1* | 4/2010 | Komine | G06F 9/52 |
| | | | 715/753 |
| 2010/0281362 A1* | 11/2010 | Bailor et al. | 715/256 |
| 2011/0010350 A1* | 1/2011 | Bhogal et al. | 707/695 |
| 2011/0106776 A1* | 5/2011 | Vik | G06F 9/4443 |
| | | | 707/698 |
| 2011/0145689 A1* | 6/2011 | Campbell | G06F 17/248 |
| | | | 715/209 |
| 2013/0127856 A1* | 5/2013 | Winnemoeller | G06T 11/001 |
| | | | 345/423 |
| 2013/0127889 A1* | 5/2013 | Winnemoeller | G06T 11/001 |
| | | | 345/582 |
| 2013/0321306 A1* | 12/2013 | Bauermeister | G06F 3/017 |
| | | | 345/173 |
| 2014/0188790 A1* | 7/2014 | Hunter | 707/610 |
| 2014/0250392 A1* | 9/2014 | Riggins | H04N 21/8545 |
| | | | 715/764 |

\* cited by examiner

ACTION RECORDS ASSOCIATED WITH EDITABLE CONTENT OBJECTS

BACKGROUND

As computing technology has advanced, numerous programs have been developed to allow people to use computers to generate various types of content, such as drawings, music, text, and so forth. While these programs provide many benefits in generating content, they are not without their problems. One such problem is that many programs allow users to undo changes made to the content. However, such undoing of changes is typically an undoing of all changes in an order opposite the order in which the changes were made, a restriction which can result in user frustration and dissatisfaction with the programs they are using.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In accordance with one or more aspects, an object action record associated with an object presented as at least part of editable content is maintained. Indications of actions performed on the object and of how to undo the actions performed on the object are included in the object action record associated with the object. However, indications of actions performed on other parts of the editable content are excluded from the object action record.

In accordance with one or more aspects, a first request to perform a first action on a first object of multiple objects presented as at least part of editable content is received, and the first action is performed on the first object. After performing the first action, a second request to perform a second action on a second object of the multiple objects is received, and the second action is performed on the second object. After performing the second action, a third request to undo the first action is received, and the first action is undone in the absence of undoing the second action.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Action records associated with editable content objects are discussed herein. A program manages various different parts of editable content, including one or more objects. For example, an object can be a paragraph of text, a particular shape of a drawing, content in a particular layer of a drawing, and so forth. Various different actions can be performed on an object. An action performed on an object refers to the object being edited or changed in some manner. For example, an action can be adding text to a paragraph, adding a line or texture to a drawing or drawing layer, adding or deleting an object, and so forth.

A program maintains one or more object action records, each object action record being a record of actions performed on a particular object of the editable content. A program can also maintain a document action record that includes indications of actions performed on parts of the editable content that are not objects having an associated object action record (the document action record can also optionally include indications of actions performed on the objects having an associated object action record).

When a user desires to undo an action on an object having an associated object action record, the user inputs a request to undo the action. In response to the user request to undo an action on a particular object, the actions in the object action list associated with the particular object are undone (e.g., in reverse order of the order in which they were included in the object action record). One or more actions on the particular object are undone without undoing any intervening actions performed on other objects or parts of the editable content.

Figure 1:
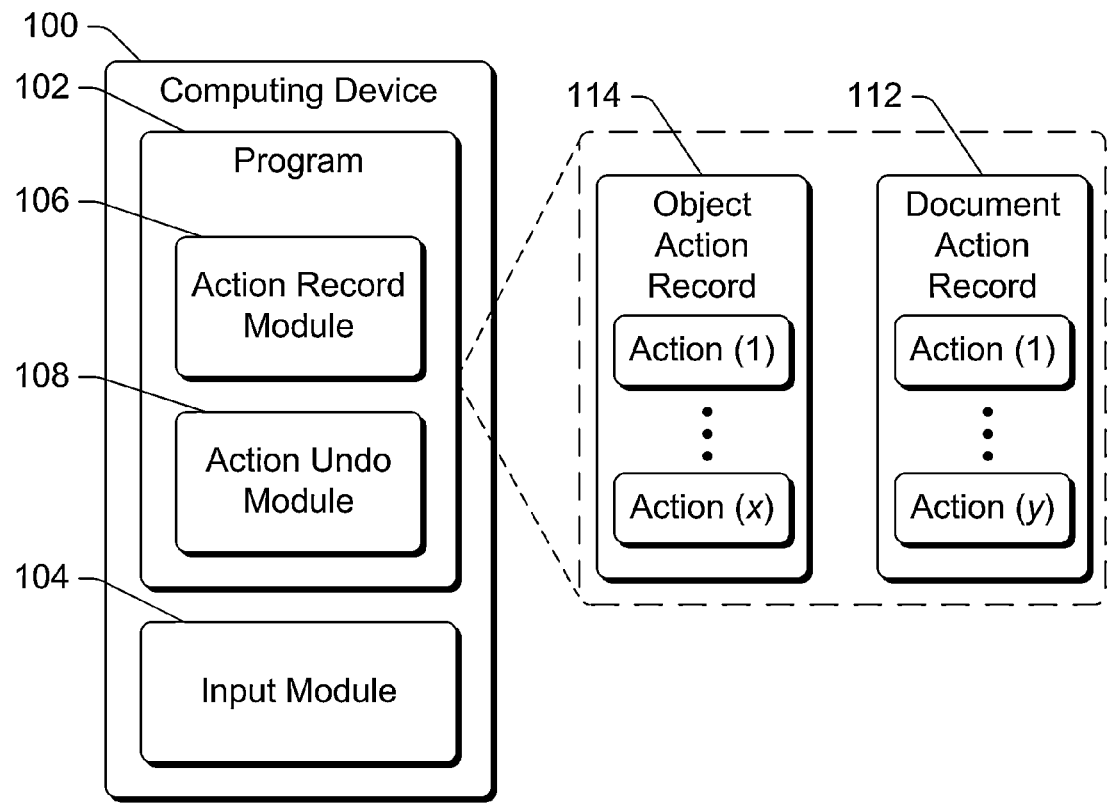
FIG. 1 is a block diagram illustrating an example computing device implementing the action records associated with editable content objects in accordance with one or more embodiments.

FIG. 1 is a block diagram illustrating an example computing device 100 implementing the action records associated with editable content objects in accordance with one or more embodiments. The computing device 100 can be a variety of different types of devices, such as a physical device or a virtual device. For example, the computing device 100 can be a physical device such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. The computing device 100 can also be a virtual device, such as a virtual machine running on a physical device. A virtual machine can be run on any of a variety of different types of physical devices (e.g., any of the various types listed above). Thus, the computing device 100 may range from a full resource device with substantial memory and processor resources (e.g., personal computers, game consoles) to a low-resource device with limited memory and/or processing resources (e.g., traditional set-top boxes, hand-held game consoles).

The computing device 100 includes a program 102 and an input module 104. The input module 104 receives user inputs from a user of the computing device 100. User inputs can be provided in a variety of different manners, such as by pressing one or more keys of a keypad or keyboard of the device 100, pressing one or more keys of a controller (e.g., remote control device, mouse, trackpad, etc.) of the device 100, pressing a particular portion of a touchpad or touchscreen of the device 100, pressing one or more buttons of a controller, making a particular gesture on a touchpad or touchscreen of the device 100, and/or making a particular gesture on a controller (e.g., remote control device, mouse, trackpad, etc.) of the device 100. User inputs can also be provided in other manners, such as via audible inputs to a microphone, via motions of hands or other body parts observed by an image capture device, and so forth.

The program 102 can be any of a variety of different computer programs, such as applications, operating system components, and so forth. The program 102 manages editable content, displaying or otherwise presenting the editable content and allowing user inputs to identify various actions (also referred to as operations) to be performed on the content such as by adding to the content, removing parts of the content, modifying parts of the content, and so forth. Editable content refers to content that can be edited or changed by the user (e.g., via any of a variety of user inputs as discussed above). The particular actions that can be performed vary based on the particular program 102. The program 102 also allows at least some actions to be undone. Undoing an action refers to returning the content to its state prior to the action having been performed. For example, if an action is to change text from normal to italics, undoing the action returns the text to normal. By way of another example, if an action is to change the color of selected rectangles in a drawing from blue to red, undoing the action returns the selected rectangles to blue.

The program 102 includes an action record module 106 and an action undo module 108. The action record module 106 manages the recording or storing of actions that can be undone in one or more action records, and the action undo module 108 manages the undoing of actions that have been recorded or stored in one or more action records. The program 102 supports object action records as well as a document action record, as discussed in more detail below.

The program 102 can be any of a variety of different programs that allow users to edit content. The content can take various forms, such as text or other characters or symbols, audio, images, video, combinations thereof, and so forth. The program 102 can be for, example, a productivity program (e.g., a word processing program or spreadsheet program), a database program, a drawing program, an image authoring or editing program, a video authoring or editing program, an audio authoring or editing program, and so forth.

The program 102 manages editable content having multiple parts, and can include one or more objects (each object being editable content). An object is part of the editable content managed by the program 102. The part of the content that constitutes an object can vary for different programs 102, and can be defined in various manners.

For example, an object can be a paragraph of characters (e.g., letters, number, symbols, etc.), or alternatively some other selected grouping of characters such as the characters on a page, the characters between section breaks, the characters in a table, and so forth. By way of another example, an object can be a particular shape of a drawing, content in a particular layer of a drawing, and so forth. By way of yet another example, an object can be a frame of video, a sequence of frames of video, a transition between frames of video, and so forth. By way of yet another example, an object can be a portion (e.g., a particular time duration) of a sound wave of audio, a transition between sound waves of two audio portions, and so forth.

An object can have an associated object action record, and which parts of the content are objects having associated object action records can be determined in a variety of different manners. The program 102 itself can define what parts of the content are objects having associated object action records. Additionally or alternatively, input can be received from various sources identifying what parts of the content are objects having associated object action records, such as input from a user of the computing device 100, input from another device or service, and so forth. For example, a user can specify that a particular layer of a drawing is to be an object having associated object action records, that a particular shape or collection of shapes in a drawing is to be an object having associated object action records, and so forth. In one or more embodiments, the program 102 is configured to identify by default particular parts of the content as objects having associated object action records, such as each layer of a drawing. This default identification can optionally be overridden by the user. Alternatively, the user can identify which parts of the content are objects by providing any of a variety of user inputs, such as selection from a menu, touching the object, outlining the object with a pointer, and so forth.

The program 102 allows different actions to be performed on an object. Different actions on objects can be performed by different programs 102. An action performed on an object refers to the object being edited or changed in some manner, including adding an object, deleting an object, modifying an object, and combinations thereof. For example, an action can be adding text to a paragraph or changing text in a paragraph. By way of another example, an action can be adding a line or texture to a drawing or layer of a drawing. By way of yet another example, an action can be deleting frames of video or applying a filter to change the appearance of frames of video. By way of yet another example, an action can be changing the playback speed of audio or applying a filter to change the playback of audio.

The program 102 allows one or more actions that can be performed on an object to be undone. The program 102 maintains multiple action records in which information identifying the actions that are performed (indications of the actions that are performed) is recorded. This information sufficiently describes the action so that the action be subsequently undone (e.g., in response to a later user request to undo the action).

The program 102 maintains a document action record 112 and an object action record 114. The object action record 114 is associated with a particular object of particular editable content managed by the program 102, and the action record module 106 stores the information identifying multiple (x) actions that are performed on that particular object in the object action record 114. Information indicating how to undo each of the multiple (x) actions is also stored in the object action record 114. The information indicating how to undo an action can be separate from the information identifying the action, or alternatively can be inherent in the identification of the action. Although a single object action record 114 is illustrated in FIG. 1, it should be noted that multiple object action records 114 can be maintained by the program 102, each of the multiple object action records being associated with a different object of the same editable content.

The document action record 112 is associated with particular editable content managed by the program 102. The action record module 106 stores in the document action record 112 information identifying multiple (y) actions that are performed on parts of the editable content that do not have an associated object action record 114. Information indicating how to undo each of the multiple (y) actions is also stored in the document action record 112. The information indicating how to undo an action can be separate from the information identifying the action, or alternatively can be inherent in the identification of the action. The action record module 106 can also optionally store in the document action record 112 information identifying the actions that are performed on objects that do have an associated object action record 114 as discussed in more detail below.

Figure 2:
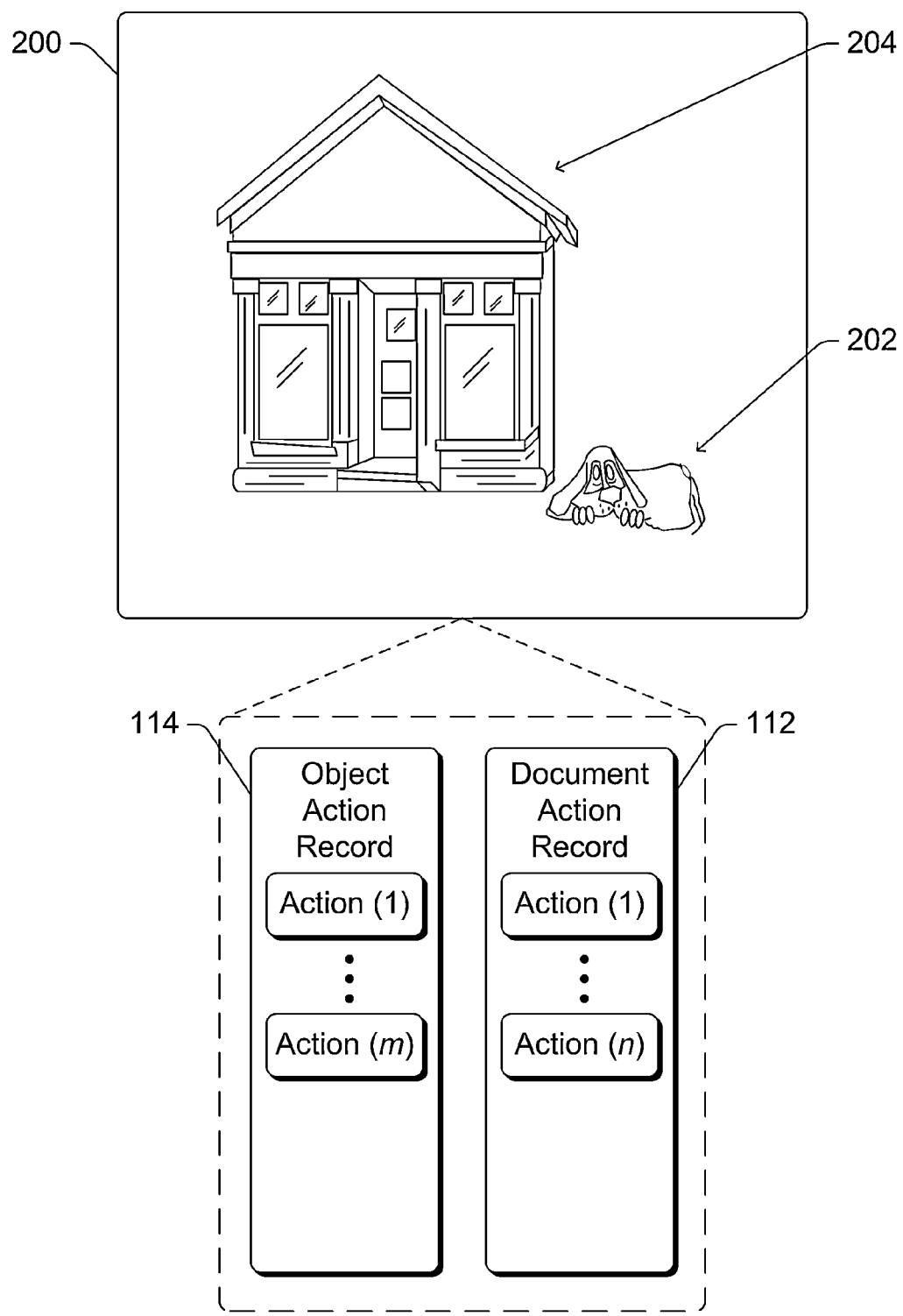
FIGS. 2, 3, 4, and 5 illustrate an example of different objects and of using a document action record and an object action record in accordance with one or more embodiments.

By maintaining an object action record 114 associated with a particular object, actions performed on that particular object can be undone independently of actions performed on other parts of the content. FIGS. 2-5 illustrate an example of different objects and of using a document action record 112 and an object action record 114. FIG. 2 illustrates editable content 200 that is a drawing, the drawing including a dog 202 and a building 204. The editable content 200 has an associated document action record 112, and the dog 202 is an object that has an associated object action record 114. Multiple (m) previous actions have been input to create the dog 202, and multiple (n) previous actions have been input to create the other parts of the editable content 200 (e.g., the building 204).

Figure 3:
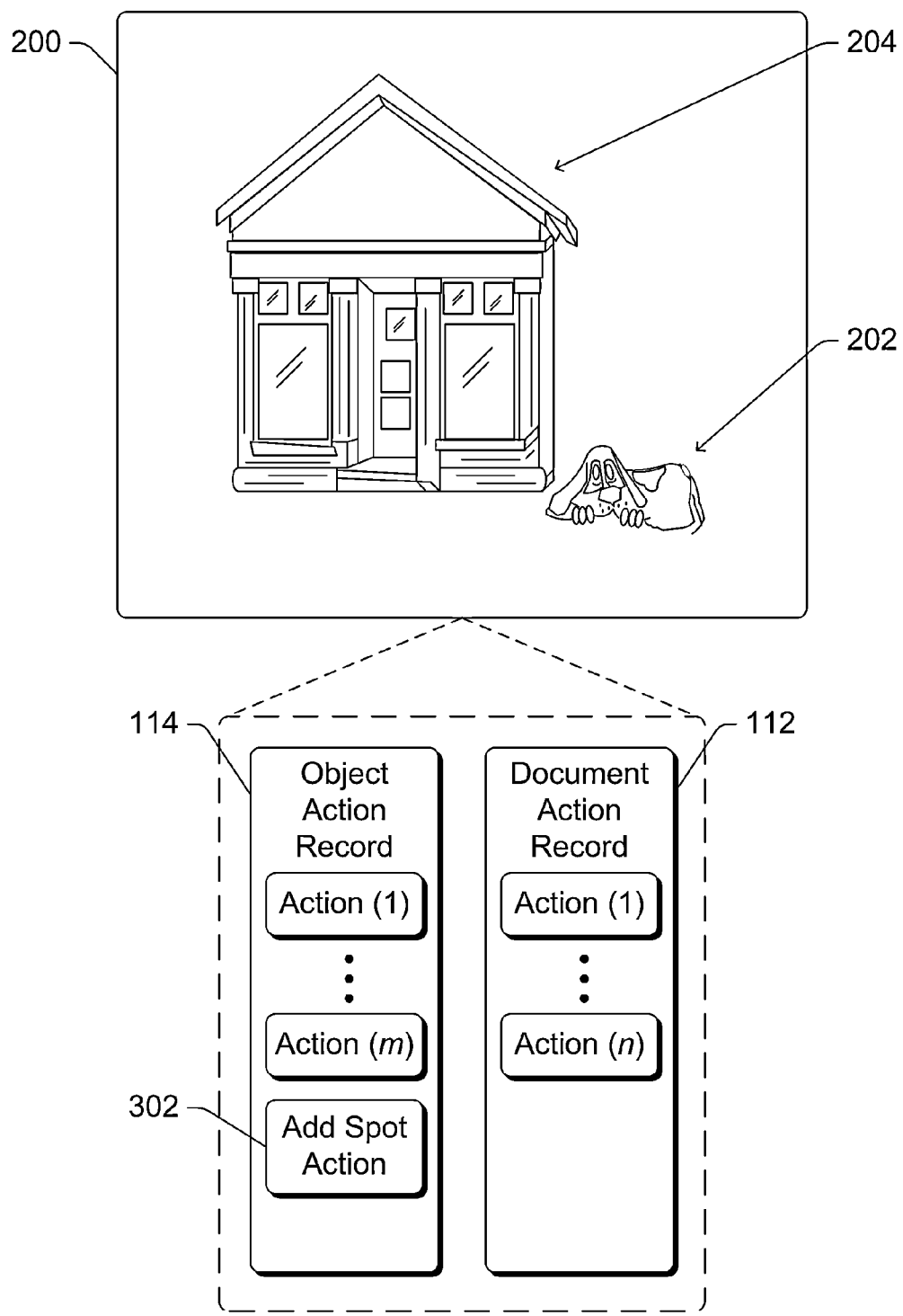

FIG. 3 illustrates the editable content 200 after user input adding a spot to the dog's back is received. Because the dog 202 is an object that has an associated object action record 114, information 302 identifying the action of adding the spot to the dog's back is stored in the object action record 114. Information identifying the action of adding the spot to the dog's back can optionally be stored in the document action record 112 as well, although not illustrated in FIGS. 2-5.

Figure 4:
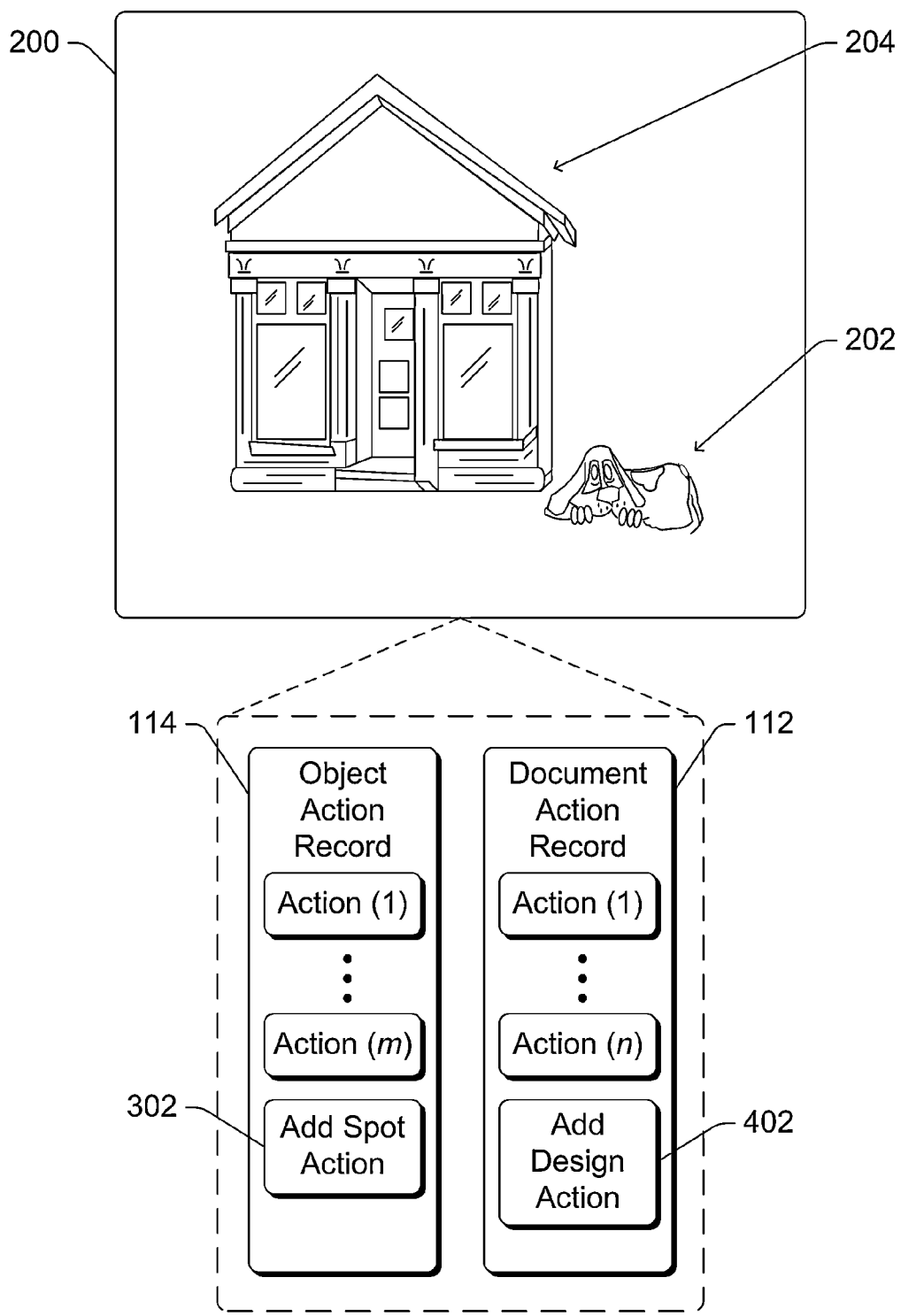

FIG. 4 illustrates the content 200 after user input adding a design to the front of the building 204 is received. The building 204 is not part of the object that is the dog 202, so information 402 identifying the action of adding the design to the front of the building 204 is stored in the document action record 112 (and is not stored in the object action record 114).

Figure 5:
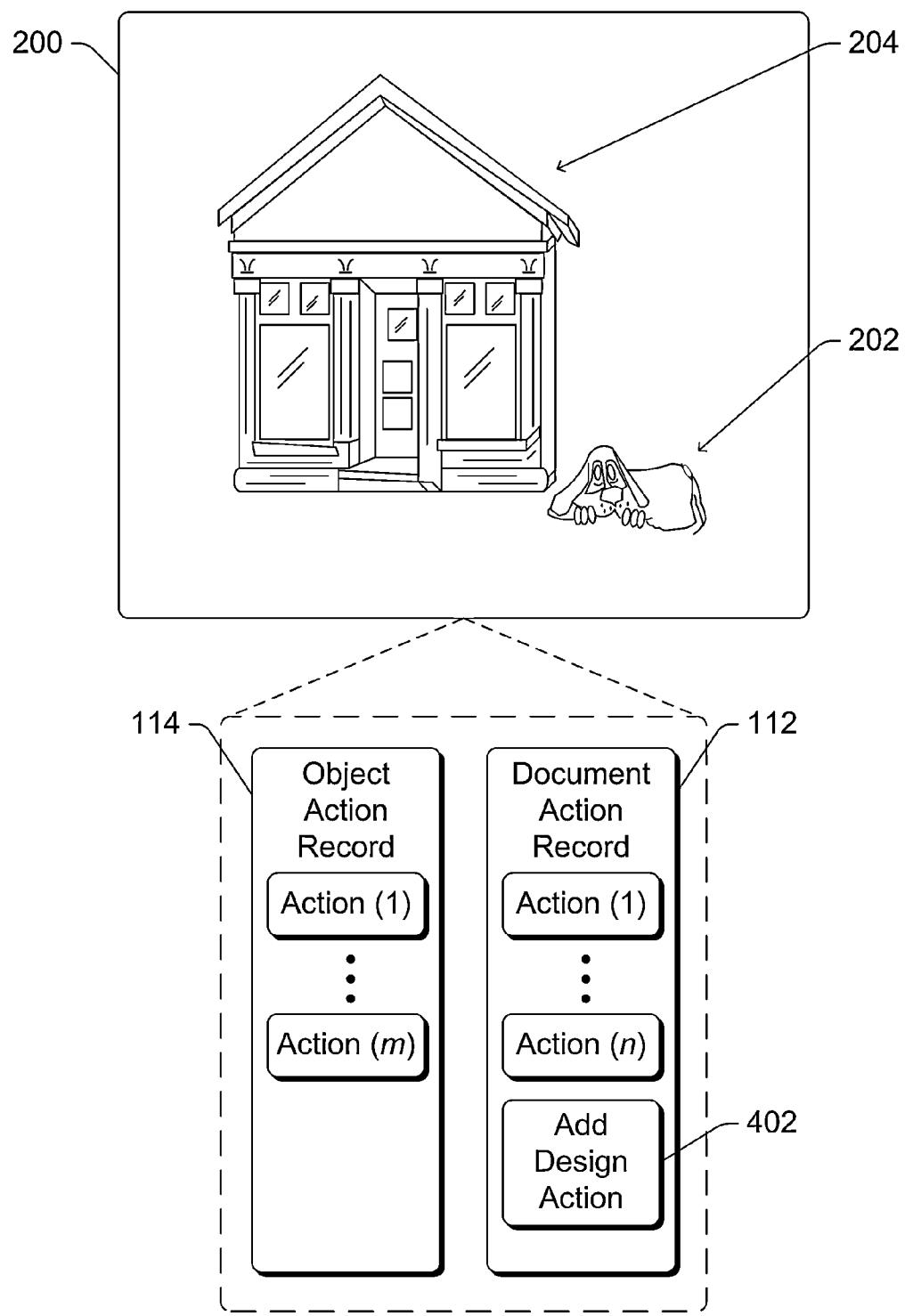

FIG. 5 illustrates the content 200 after user input undoing the action of adding the spot to the dog's back is received. Because the dog 202 is an object that has an associated object action record 114, the action of adding the spot is undone without undoing the action of adding the design to the front of the building 204 even though the action of adding the design to the front of the building 204 was done after the action of adding the spot to the dog 202. The information identifying the action of adding the spot to the dog's back is removed from the object action record 114, but the information 402 identifying the action of adding the design to the front of the building 204 remains in the document action record 112. Thus, actions performed on an object and identified in the object action record associated with the object can be done in the absence of undoing intervening actions on other parts of the object.

Returning to FIG. 1, the program 102 supports different modes of operation for the document action record 112 and the object action record 114. In one or more embodiments, these modes of operation include an exclusive mode and a shared mode. Each of multiple object action records 114 associated with different objects can operate in the same or different modes. For example, all objects can operate in exclusive mode, all objects can operate in shared mode, or some objects can operate in exclusive mode while other objects operate in shared mode. Although exclusive and shared modes are discussed herein, the program 102 can support various other modes of operation.

For an object action record 114 operating in the exclusive mode (also referred to as the associated object operating in the exclusive mode), the action record module 106 adds information identifying actions on the object to the object action record 114 but not to the document action record 112. For an object action record 114 operating in the shared mode (also referred to as the associated object operating in the shared mode), the action record module 106 adds information identifying actions on the object to both the object action record 114 and the document action record 112.

The following examples illustrate the difference between the usage of the exclusive and shared modes. Assume a user draws ten rectangles on a canvas using a drawing program, and selects the second rectangle to have an associated object action record in the exclusive mode. The user selects all ten rectangles and does a series of actions, which are recorded in the document action record (because they were performed on parts of the editable content that do not have an associated object action record) and in the object action record (because they were also performed on the object having the associated object action record). The user then inputs an undo request identifying the document action record (or identifying the entire document). In response to the user request, one or more actions (as identified in the document action record) are undone on all ten rectangles except for the second rectangle. The user can have actions undone on the second rectangle by inputting an undo request identifying the object action record associated with the second rectangle (or identifying the second rectangle).

In contrast, assume a user draws ten rectangles on a canvas, and selects the second rectangle to have an associated object action record in the shared mode. The user selects all ten rectangles and does a series of actions, which are recorded in the document action record (because they were performed on parts of the editable content that do not have an associated object action record) and in the object action record (because they were also performed on the object having the associated object action record). The user then inputs an undo request identifying the document action record (or identifying the entire document). In response to the user request, one or more actions (identified in the document action record) are undone on all ten rectangles including the second rectangle. Additionally, the user can still have actions undone on only the second rectangle by inputting an undo request identifying the object action record associated with the second rectangle (or identifying the second rectangle).

Figure 6:
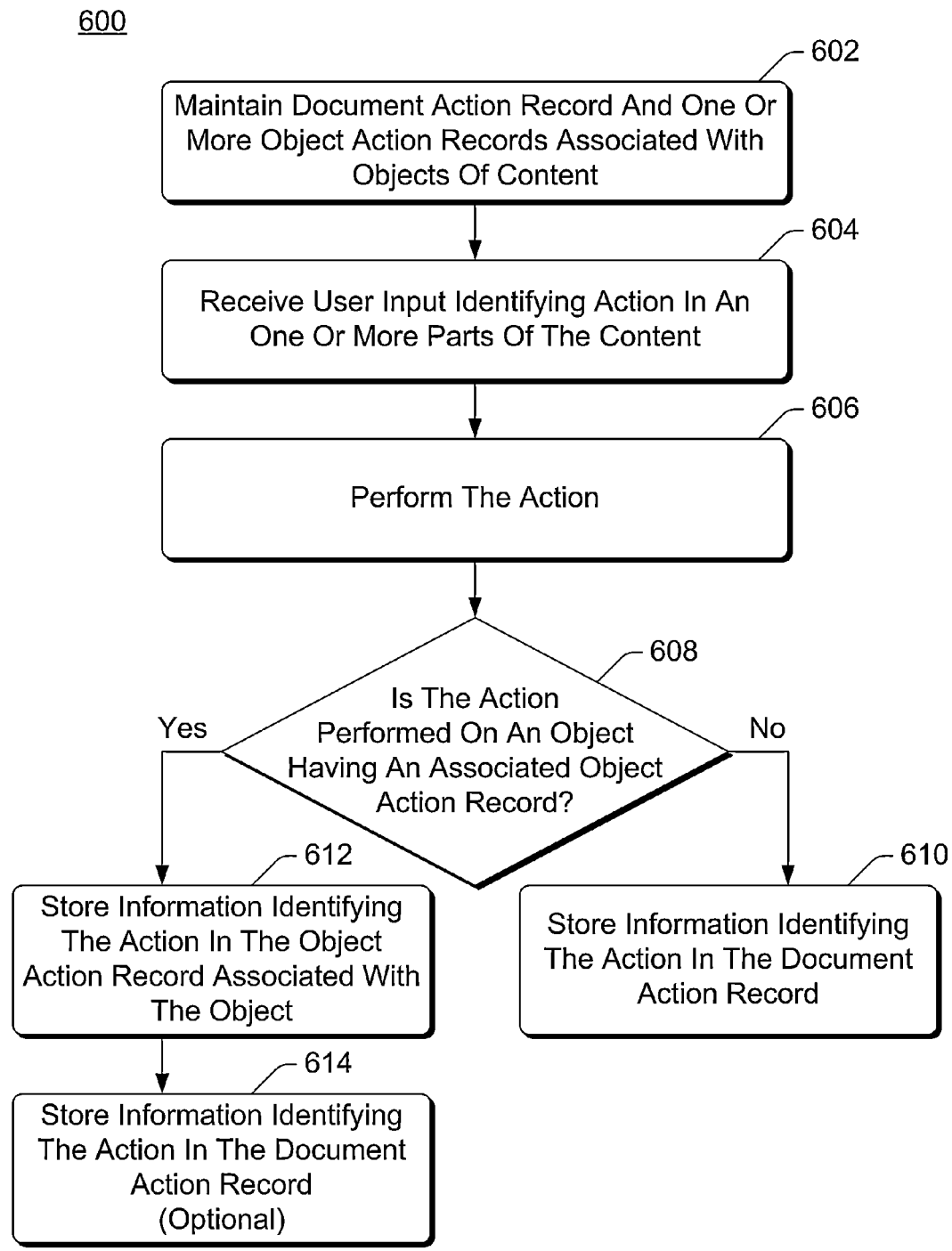
FIG. 6 is a flowchart illustrating an example process for maintaining information identifying actions in accordance with one or more embodiments.

FIG. 6 is a flowchart illustrating an example process 600 for maintaining information identifying actions in accordance with one or more embodiments. Process 600 is carried out by a program of a computing device, such as program 102 of FIG. 1, and can be implemented in software, firmware, hardware, or combinations thereof. Process 600 is shown as a set of acts and is not limited to the order shown for performing the operations of the various acts. Process 600 is an example process for maintaining information identifying actions; additional discussions of maintaining information identifying actions are included herein with reference to different figures.

In process 600, a document action record and one or more object action records associated with objects of editable content are maintained (act 602). Multiple object action records can be maintained, each associated with a different object of the editable content as discussed above.

User input identifying an action on one or more parts of the content is received (act 604). The action can be received via any of a variety of different user inputs as discussed above. The action can be on parts of the content that include objects having associated object action records and/or on other parts of the content. For example, referring to FIG. 2, an action can be performed on part of the content including only the dog 202 (which is an object having an associated object action record), on part of the content other than the dog 202 (e.g., the building 204), or on all of the content including the dog 202 and the building 204.

The action identified by the user input is performed (act 606). The action can be any of a variety of different actions, as discussed above.

A check is made as to whether the action is performed on an object having an associated object action record (act 608). If the action is not performed on an object having an associated object action record, then information identifying the action is stored in the document action record (act 610). As the action is not performed on an object having an associated object action record, the action is not stored in any object action record.

However, if the action is performed on an object having an object action record, then information identifying the action is stored in the object action record associated with the object (act 612). If the action is performed on multiple objects having object action records, then information identifying the action is stored in each object action record associated with one of the multiple object action records.

Information identifying the action is also optionally stored in the document action record (act 614). If the action is performed on at least one object operating in the shared mode, then the information identifying the action is stored in the document action record. Additionally, if the action is performed on part of the content that is not an object having an associated object action record, then the information identifying the action is stored in the document action record. However, if the action is performed on one or more objects all operating in the exclusive mode, and the action is not performed on any part of the content that is not an object having an associated object action record, then the information is not stored in the document action record.

Figure 7:
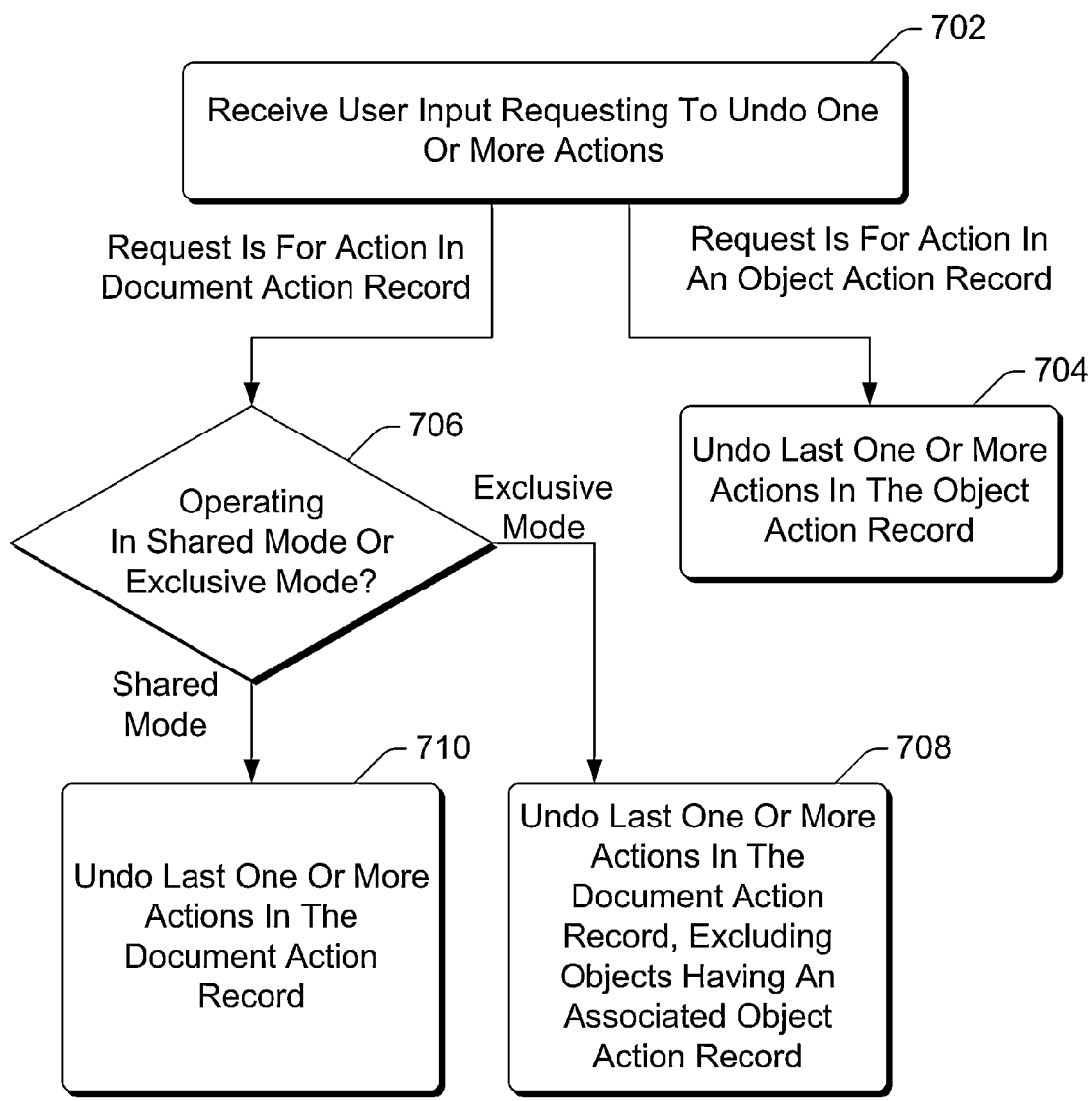
FIG. 7 is a flowchart illustrating an example process for undoing actions using an object based action record in accordance with one or more embodiments.

FIG. 7 is a flowchart illustrating an example process 700 for undoing actions using an object based action record in accordance with one or more embodiments. Process 700 is carried out by a program of a computing device, such as program 102 of FIG. 1, and can be implemented in software, firmware, hardware, or combinations thereof. Process 700 is shown as a set of acts and is not limited to the order shown for performing the operations of the various acts. Process 700 is an example process for undoing actions using an object based action record; additional discussions of undoing actions using an object based action record are included herein with reference to different figures.

In process 700, user input requesting to undo one or more actions is received (act 702). The user input can be any of a variety of different user inputs as discussed above. The user input also identifies a number of actions to be undone (e.g., one). The request to undo one or more actions is a request to undo one or more actions in a document action record, or a request to undo one or more actions in an object action record.

The user can indicate whether the request is to undo an action(s) in a document action record or in an object action record in any of a variety of different manners. For example, a displayed button or menu option may be selected by the user to request to undo an action(s) in a document action record. By way of another example, a menu option or other button may displayed in response to user selection of an object in the content, and the menu option or other button may be selected by the user to request to undo an action(s) in an object action record.

In response to the user input being a request to undo one or more actions in an object action record, the last one or more actions in the object action record are undone (act 704). Undoing an action refers to returning the content to its state prior to the action having been performed, so whatever action(s) were performed on the object are undone. The information identifying the action(s) is also deleted or otherwise removed from the object action record. Deleting or otherwise removing the information identifying an action from an action record is also referred to as deleting or otherwise removing the action from the action record.

In response to the user input being a request to undo one or more actions in a document action record, a check is made as to whether objects in the content are operating in shared mode or in exclusive mode (act 706). If at least one object in the content is operating in exclusive mode, then the last one or more actions in the document action record are undone (act 708), excluding objects having an associated object action record operating in exclusive mode. The action(s) is also deleted or otherwise removed from the document action record. Thus, in act 708 the one or more actions are undone on parts of the content indicated by the action(s) in the document action record except for parts of the content that are objects operating in exclusive mode. The parts of the content indicated by the action(s) are all parts of the content affected by the action (e.g., if the action changed the color of some parts of the content from red to blue but left the color of other parts of the content unchanged, then those parts whose color was changed are identified in the document action record and the action is undone by changing the color of those parts back to red and leaving the color of the other parts of the content unchanged).

However, if none of the objects in the content are operating in exclusive mode (all are operating in shared mode), then the last one or more actions in the document action record are undone (act 710). The action(s) is also deleted or otherwise removed from the document action record. As the objects are all operating in shared mode, the action(s) are undone on all of the objects in act 710 despite the existence of the object action records. The action(s) are undone on all parts of the content affected by the action(s).

In one or more embodiments, when an action in the document action record is undone in act 710, care is taken to delete the corresponding action on any of the object action records operating in shared mode. As discussed above, when an object is operating in shared mode, the information identifying an action taken is added to both the document action record and the object action record. If the action is undone in act 710, the action is removed from the document action record but remains in the object action record. Thus, care is taken to remove the corresponding action from the object action record as well.

The corresponding action in the object action record can be identified in a variety of different manners. For example, actions in the document action record and object action record may have identifying information (e.g., identifiers assigned by the action record module 106 of FIG. 1, timestamps of when the actions occurred, etc.), with the same action added to a document action record and an object action record having the same identifiers. Thus, when removing the action from the document action record, the identifier of the action can be determined and the action in the object action record having the same identifier can also be removed from the object action record. Alternatively, the program 102 can maintain tables or other data structures allowing the corresponding actions in the object action record and the document action record to be readily identified.

Alternatively, no such consideration of deleting a corresponding action in the object action record need be taken. Rather, the action can be deleted from the document action record in act 710 and remain in the object action record.

Returning to FIG. 1, the document action record 112 and object action record 114 are discussed herein as being last in, first out data structures, so the last (most recent) action that is stored in a record is the first action that is undone. Alternatively, other data structures can be used, allowing actions to be undone in other than last in, first out order. Similarly, other rules or criteria can be applied to determine which actions are undone (e.g., a user may optionally be able to select which one or more actions are undone).

In one or more embodiments, the document action record 112 and object action record 114 are generated at runtime, and are maintained in memory of the computing device 100 (e.g., random access memory (RAM)) while the program 102 is running, but are not maintained after the program 102 stops running. Alternatively, the document action record 112 and/or object action record 114 can be persisted (e.g., in nonvolatile memory) when the program 102 stops running and retrieved when the program 102 resumes running (including situations in which the computing device 100 is powered down after the program 102 stops running and is subsequently powered back on prior to the program 102 resuming running).

Additionally, in one or more embodiments any number of different parts of editable content can be an object, and the program 102 can have any number of object action records 114. Alternatively, the number of object action records 114 (and thus the number of different parts of the editable content that can be selected as objects) can be limited. This limit can be a threshold number of objects and/or object action records, which can be determined in various manners such as available resources (e.g., free memory, processor capacity, etc.) of the computing device 100.

Figure 8:
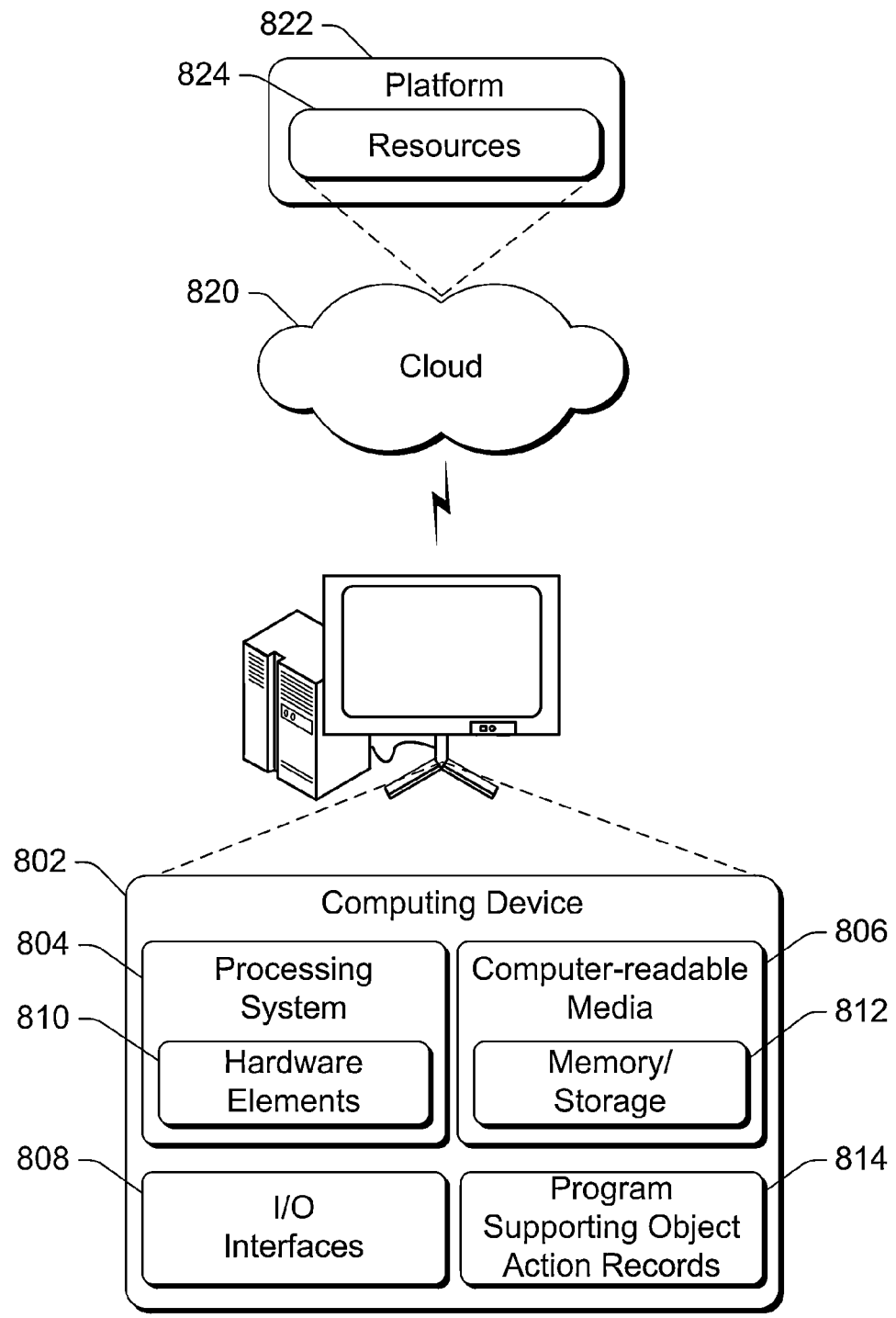
FIG. 8 illustrates an example system that includes an example computing device that is representative of one or more computing systems and/or devices that may implement the various techniques described herein.

FIG. 8 illustrates an example system generally at 800 that includes an example computing device 802 that is representative of one or more computing systems and/or devices that may implement the various techniques described herein. This is illustrated through inclusion of a program 814 that supports object action records, which may be configured to implement the action records associated with editable content objects functionality discussed herein. Computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

Processing system 804 is representative of functionality to perform one or more operations using hardware. Accordingly, processing system 804 is illustrated as including hardware elements 810 that may be configured as processors, functional blocks, and so forth. This may include implementation in hardware as an application specific integrated circuit or other logic device formed using one or more semiconductors. Hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

Computer-readable storage media 806 is illustrated as including memory/storage 812. Memory/storage 812 represents memory/storage capacity associated with one or more computer-readable media. Memory/storage component 812 may include volatile media (such as random access memory (RAM)) and/or nonvolatile media (such as read only memory (ROM), Flash memory, optical disks, magnetic disks, and so forth). Memory/storage component 812 may include fixed media (e.g., RAM, ROM, a fixed hard drive, and so on) as well as removable media (e.g., Flash memory, a removable hard drive, an optical disc, and so forth). Computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media.

The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. Computing device 802 may be configured to implement particular instructions and/or functions corresponding to the software and/or hardware modules. Accordingly, implementation of a module that is executable by computing device 802 as software may be achieved at least partially in hardware, e.g., through use of computer-readable storage media and/or hardware elements 810 of processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of computing device 802 and are not limited to the specific examples of the techniques described herein. This functionality may also be implemented all or in part through use of a distributed system, such as over a "cloud" 820 via a platform 822 as described below.

Cloud 820 includes and/or is representative of a platform 822 for resources 824. Platform 822 abstracts underlying functionality of hardware (e.g., servers) and software resources of cloud 820. Resources 824 may include applications and/or data that can be utilized while computer processing is executed on servers that are remote from computing device 802. Resources 824 can also include services provided over the Internet and/or through a subscriber network, such as a cellular or Wi-Fi network.

Platform 822 may abstract resources and functions to connect computing device 802 with other computing devices. Platform 822 may also serve to abstract scaling of resources to provide a corresponding level of scale to encountered demand for resources 824 that are implemented via platform 822. Accordingly, in an interconnected device embodiment, implementation of functionality described herein may be distributed throughout system 800. For example, the functionality may be implemented in part on computing device 802 as well as via platform 822 that abstracts the functionality of the cloud 820.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   maintaining, by a computing device, an object action record associated with an object presented as a portion of a document comprising editable content, and a document action record associated with the editable content, the document action record comprising only indications of actions that are performed on parts of the editable content that do not have associated object action records;
   receiving a request to perform an action on the object and at least one other object of the editable content, the at least one other object not having an associated other object action record;
   performing the action on the object and the at least one other object;
   adding, to the object action record associated with the object, an indication of the action performed on the object and of how to undo the action performed on the object;
   including, in the document action record, an indication of the action performed on the at least one other object and indications of actions performed on other objects of the editable content;
   excluding, from the object action record, all indications of actions performed on the other objects of the editable content;
   receiving a request to undo the action in the object action record;
   in response to the request to undo the action, undoing the action on the object but not undoing the action on the at least one other object, the action being a most recent action in the object action record; and
   removing the action from the object action record and leaving the action in the document action record.

2. A method as recited in claim 1, further comprising:
receiving a request to undo an action in the document action record; and
undoing, in response to the request to undo the action, a last action in the document action record by undoing the action on all objects of the content affected by the action.

3. A method as recited in claim 1, further comprising:
receiving a request to undo an action in the document action record; and
undoing, in response to the request to undo the action, a last action in the document action record by undoing the action on all objects of the content affected by the action except for objects having an associated object action record.

4. A method as recited in claim 1, the object comprising a layer of a drawing.

5. A method as recited in claim 1, the object comprising a shape in a drawing.

6. A method as recited in claim 1, the object comprising a paragraph in a word processing program running of the computing device.

7. A method as recited in claim 1, further comprising:
maintaining an additional object action record associated with an additional object of the editable content;
receiving a request to perform an additional action on the additional object; and
storing an indication of the additional action in the additional object action record but not in the object action record associated with the object.

8. A method as recited in claim 1, further comprising:
maintaining two or more additional object action records each associated with one of two or more additional objects of the editable content;
receiving a request to perform an additional action on one of the two or more additional objects; and
adding, to the additional object action record associated with the one additional object but not to the object action record associated with the object, an indication of the additional action.

9. A method comprising:
receiving a first request to perform a first action on a first object of multiple objects presented as a portion of a document comprising editable content, the first object comprising a first layer of a drawing;
performing, at a computing device, the first action on the first object;
identifying, by the computing device, the first layer of the drawing as having an associated first object record;
storing an indication of the first action in the first object record associated with the first layer of the drawing;
receiving, after performing the first action, a second request to perform a second action on a second object of the multiple objects of the document, the second object comprising a second layer of the drawing;
performing the second action on the second object;
identifying, by the computing device, the second layer of the drawing as having an associated second object record;
storing an indication of the second action in the second object record associated with the second layer of the drawing, but not storing the indication of the second action in the first object record;
receiving, after performing the second action, an undo request to undo the first action; and
undoing, in response to the undo request to undo the first action, only the first action performed on the first object without undoing the second action performed after the first action on the second object.

10. A method as recited in claim 9, further comprising:
maintaining a document action record associated with the editable content;
receiving a third request to perform a third action on parts of the editable content other than the first object and the second object; and
storing an indication of the third action in the document action record.

11. A method as recited in claim 10, further comprising:
storing an indication of both the first action and the third action in the first object record; and
storing an indication of both the second action and the third action in the second object record.

12. A method as recited in claim 9, further comprising:
receiving, after performing the second action, a third request to perform a third action on both a third object and the first object of the multiple objects of the document;
performing the third action on the third object and on the first object; and
storing an indication of the third action in a third object record associated with the third object, and storing an indication of the third action in the first object record associated with the first object, but not storing the indication of the third action in the second object record.

13. A method as recited in claim 9, wherein the identifying the first layer of the drawing and the identifying the second layer of the drawing are default identifications performed by the computing device, the operations further comprising:
receiving a user input to identify an additional object to have an associated third object action record.

14. A method as recited in claim 13, wherein the additional object comprises a shape in a drawing or a paragraph in a word processing program running of the computing device.

15. A computing device comprising:
an input module configured to receive user inputs to the computing device, the user inputs identifying actions performed on a document comprising editable content presented by the computing device, the input module further configured to receive input to undo a most recent action in an object action record associated with a particular object comprising a portion of the editable content of the document, the undo action received after at least one other action was made on other objects in the editable content, at least some of the other objects of the editable content having respective object action records that include actions performed on the corresponding other objects but exclude actions performed on the particular object, the object action record for the particular object including indications of actions performed on the particular object and of how to undo the actions performed on the particular object, and the object action record excluding all indications of actions performed on the other objects of the editable content in the document;
storage configured to store indications of at least some of the actions performed on the editable content in the object action record and store actions performed on the at least some of the other objects in the respective object action records; and
an action undo module configured to undo, in response to the input to undo the most recent action in the object action record, the action in the object action record by undoing the action on the particular object but not undoing the action on the other objects of the content.

16. A computing device as recited in claim 15, storage being further configured to store indications of at least some of the actions performed on the editable content in a document action record that is associated with the editable content, the document action record including indications of actions performed on the other objects of the editable content.

17. A computing device as recited in claim 16, the action undo module further configured to undo, in response to the request to undo the action, the action in the document action record by undoing the action on all objects of the content affected by the action.

18. A computing device as recited in claim 16, the action undo module further configured to undo, in response to the request to undo the action, the action in the document action record by undoing the action on all objects of the content affected by the action except for objects having an associated object action record.

19. A computing device as recited in claim 16, the storage configured to exclude from the document action record indications of the actions performed on the object.

20. A computing device as recited in claim 16, the object comprising a layer in a drawing, a shape in a drawing, or a paragraph in a word processing program running of the computing device.

* * * * *